United States Patent
McAllister et al.

(10) Patent No.: US 6,385,584 B1
(45) Date of Patent: May 7, 2002

(54) PROVIDING AUTOMATED VOICE RESPONSES WITH VARIABLE USER PROMPTING

(75) Inventors: Alexander I. McAllister, Silver Spring, MD (US); James E. Curry, Herndon, VA (US)

(73) Assignee: Verizon Services Corp., New York, NY (US)

(*) Notice: Subject to any disclaimer, the term of this patent is extended or adjusted under 35 U.S.C. 154(b) by 0 days.

(21) Appl. No.: 09/302,432

(22) Filed: Apr. 30, 1999

(51) Int. Cl.[7] .............................................. G10L 15/00
(52) U.S. Cl. ..................................... 704/275; 379/10.01
(58) Field of Search ................................ 704/270–275, 704/257; 340/573.1; 379/10.01

(56) References Cited

U.S. PATENT DOCUMENTS

| | | | |
|---|---|---|---|
| 3,488,443 A | | 1/1970 | Smith |
| 5,029,214 A | * | 7/1991 | Hollander .................... 704/272 |
| 5,434,906 A | | 7/1995 | Robinson et al. |
| 5,434,908 A | | 7/1995 | Klein |
| 5,553,121 A | | 9/1996 | Martin et al. |
| 5,555,291 A | | 9/1996 | Inniss et al. |
| 5,757,644 A | | 5/1998 | Jorgensen et al. |
| 5,768,347 A | | 6/1998 | Beyda |
| 5,923,252 A | * | 7/1999 | Sizer et al. ............... 340/573.1 |
| 5,933,475 A | * | 8/1999 | Coleman .................. 379/10.01 |

OTHER PUBLICATIONS

Cambridge University Press, Numerical Recipes in C: The Art of Scientific Computing, Chapter 7., Random Numbers, pp. 274–287.

* cited by examiner

Primary Examiner—David D. Knepper
(74) Attorney, Agent, or Firm—Fulbright & Jaworski, LLP

(57) ABSTRACT

A voice response unit (VRU) includes a library of content equivalent messages and prompts which may be substituted for one another to vary the presentation of messages provided to a user and thereby more closely simulate a human operator. Groups of content equivalent messages and prompts include multiple audio files, each with a slightly different wording or phraseology, but conveying substantially the same information. After a particular message content is selected, the corresponding group of messages is identified and a random number is generated and used to select one of the audio files of the group for playback. The VRU may be included as part of an automated dialer or auto attendant. In such a system, a calling party is greeted by the VRU and is prompted by a randomly selected prompt to speak the name of the called party. The system accesses a telephone directory, attempts to identify a name corresponding to the name spoken, and dials the number. The caller may interrupt or request alternative processing during a predetermined time period after the system has selected and read back a closest matching name or its corresponding telephone number. If processing is halted by the caller indicating that the name or telephone number selected by the system is incorrect, the system will attempt to identify a second closest guess, or if none is available, to ask the caller to reinput the name of the called party. Alternative processing includes hearing the telephone number without having it dialed, and diverting a call to voice mail.

18 Claims, 9 Drawing Sheets

```
unsigned long next=1;

int rand(void)
{
        next = next*1103515245 + 12345
        return (unsigned int) (next/65536) % 32768
} void srand(unsigned int seed)
{
        next=seed;
}
```

FIG.2

| Group | Prompt No. 1 | Prompt No. 2 | Prompt No. 3 | Prompt No. 4 | Prompt No. 5 |
|---|---|---|---|---|---|
| A | (Prompt A1) | (Prompt A2) | (Prompt A3) | (Prompt A4) | (Prompt A5) |
| B | (Prompt B1) | (Prompt B2) | (Prompt B3) | (Prompt B4) | (Prompt B5) |
| C | (Prompt C1) | (Prompt C2) | (Prompt C3) | (Prompt C4) | (Prompt C5) |
| D | (Prompt D1) | (Prompt D2) | (Prompt D3) | (Prompt D4) | (Prompt D5) |
| E | (Prompt E1) | (Prompt E2) | (Prompt E3) | (Prompt E4) | (Prompt E5) |

FIG.3

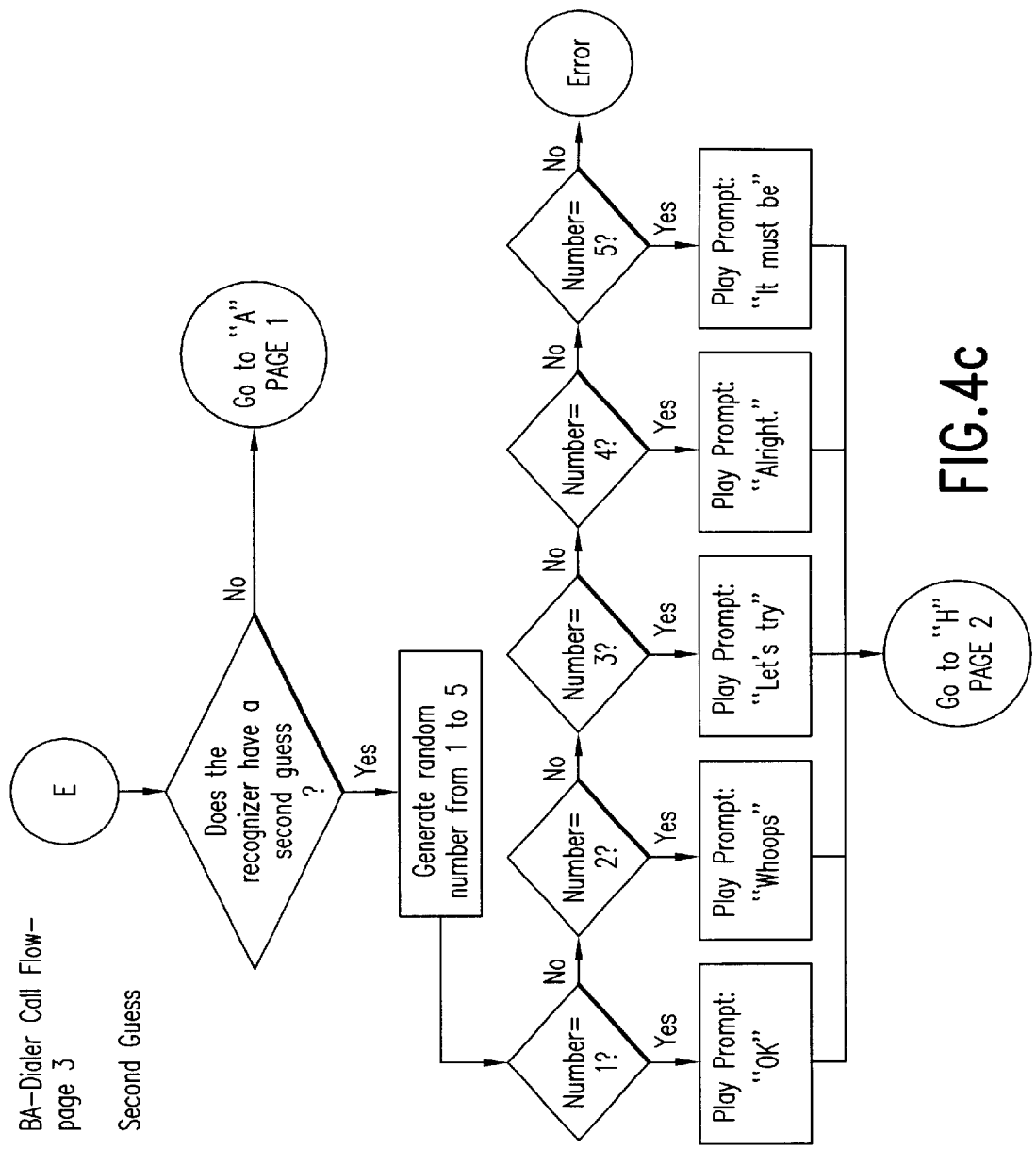

PROVIDING AUTOMATED VOICE RESPONSES WITH VARIABLE USER PROMPTING

BACKGROUND OF THE INVENTION

1. Field of the Invention

The present invention relates generally to telecommunications and particularly to voice response platforms and methods.

2. Description of the Related Technology

Voice response units (VRUs) and systems are widely used to replace or supplement human operators and attendants. VRUs provide user access to information using a conventional telephone by providing voice prompts and information. The user accesses the platform using a conventional telephone and interacts using, typically, either the touch tone pad and DTMF signaling or by speaking requests and responses. The VRU, in response, greets callers and provides instructions, prompts, menus, and information to the user using prerecorded or synthesized speech. These voice response units are extensively used by service providers, such as banks, government offices, customer service organizations, etc. to automate telephone call answering, routing and responding to inquiries. VRUs are also used to interface users with other applications, such as voice mail systems and telephone directory services.

VRUs are programmed to provide set responses to particular events and requests. Thus, a VRU may answer an incoming telephone call with a standard greeting followed by a menu or other information describing available choices and sub-menus available to the user together with the appropriate access method. For example, the user may be prompted to enter the number "1" using the telephone touch tone pad to indicate that a first option is desired, the number "2" to select a second option, etc. Alternatively, if the VRU includes a speech recognition capability, the VRU may prompt the user to speak a desired option or to input other information such as the name of a called party. As the VRU interacts with the user, it will provide information and prompting using appropriate prestored or synthesized voice messages.

As part of the scripting process, some VRUs take into account additional information in selecting an appropriate voice message. For example, some VRUs will greet a caller with a message appropriate to the time of day, day of week, etc. Certain VRUs also take into consideration information obtained about the caller to tailor an appropriate response. For example, once a caller has been identified either through the user entering identifying information such as a Social Security number or automatically through the use of automatic number identification (ANI), the VRU may tailor its scripts and messaging to that user by, for example, incorporating the user's name into the script as appropriate. Other VRUs allow the user to select the types of messages used or automatically attempt to select one of several available scripts appropriate to a particular user. For example, an inexperienced user may manually select detailed instructions for using an unfamiliar system while more experienced users may elect to receive more abbreviated prompts. Alternatively, the system may automatically select an appropriate level of detail based on user response time or the number of erroneous or incomplete responses received from the caller to prior prompts. However, while the system will adapt to a user by providing an appropriate script, the wording of each script is fixed and invariable.

While VRUs have consistently improved the speech quality of prompts and information provided to a user, present systems still fail to fully simulate the speech patterns of a human operator or attendant. By providing the same prompts over and over to a user, user frustration using the automated platform may be heightened. Still further, the user has no indication that a prior response has been acknowledged by the system when the system provides the same wording for a prompt as previously used. Further, if a user does not understand a prompt, mere repetitions of the prompt will most likely not be helpful.

Accordingly, a need exists for a more user friendly, human sounding VRU to enhance user interaction and minimize frustration. A further need exists for a VRU which reduces the monotony characteristic of conventional automated response systems.

SUMMARY OF THE INVENTION

It is an object of the invention to provide a voice response system and method of responding to user requests with spoken responses and prompts simulating human operator speech patterns and variations.

It is another object of the invention to avoid speech qualities and characteristics attributable to mechanized attendant systems.

A still further object of the invention is to provide a system and method of providing voiced information and prompts which assists a user's understanding by providing alternative wording of and for system voice scripts.

According to an aspect of the invention, a voice response system provides variations in verbal prompts provided to a user to simulate the wording and sentence structure variations characteristic of a human operator. These variations are introduced by randomly selecting from among several content-equivalent messages or prompts in response to a pseudorandom number generated at the time each prompt or message is to be retrieved and used. Since each of the content equivalent prompts varies slightly in wording or sentence structure from one another, random wording variations are included in the prompts as would be characteristic of a human operator.

A voice response unit according to an aspect of the invention responds to spoken commands and includes a memory storing a plurality of voice messages arranged in groups of content equivalent messages, each of the messages of a group having a different wording. A speech recognition engine receives a speech input signal and, in response, provides an output signal indicative of the speech input signal. A processor responds to both the input signal for selecting one of the groups of content equivalent messages and to a pseudorandom number for selecting one of the voice messages within the selected group. A speech output device provides an audio signal corresponding to the selected voice message stored in the memory.

According to a feature of the invention, the processor further includes a pseudorandom number generator for supplying a pseudorandom number. The pseudorandom number generator calculates numeric values falling within a predetermined range, the range being divided into a plurality of subranges. Within each of the groups of voice messages, each voice message is associated with a different one of the subranges. The subranges may be substantially coextensive and equal in number to a number of voice messages within each of the groups of content equivalent messages. Further, each of the numeric values may comprise a uniform deviate within the predetermined range.

According to another feature of the invention, the voice messages are stored in a variety of formats including WAV, compressed audio and MP3 formats.

According to another feature of the invention, the voice response unit further includes an interface connected to a telephone switch which receives the speech input signal. An electronic telephone directory lists subscribers and their respective telephone numbers. A dialer is responsive to a selected one of the telephone numbers for completing a telephone call to the corresponding subscriber, wherein the processor is responsive to the output signal from the speech recognition engine for selecting one of the subscribers and an associated one of the telephone numbers from the electronic telephone directory.

According to another aspect of the invention, a method of responding to spoken commands includes a step of storing a plurality of voice messages arranged in groups of content equivalent messages, each of the messages of a group having a different wording. The method further includes the steps of receiving a speech signal, processing the speech signal to recognize a content thereof, and selecting, in response to the content, one of the groups of content equivalent messages. Further included are the steps of generating a pseudorandom number, selecting one of the voice messages within the selected group in response to the pseudorandom number generated, and providing an audio signal corresponding to the selected voice message stored in the memory.

According to another aspect of the invention, a computer readable medium includes program instructions that implement a method of responding to spoken commands, the method including the steps of storing a plurality of voice messages arranged in groups of content equivalent messages, each of the messages of the group having a different wording; receiving a speech input signal; processing the speech signal to recognize the content thereof; selecting, in response to the content, one of the groups of content equivalent messages; generating a pseudorandom number; selecting one of the voice messages within the selected group in response to the pseudorandom number; and providing an audio output signal corresponding to the selected voice message stored in the memory. These, together with other objects and advantages which will be subsequently apparent, reside in the details of construction and operation as more fully hereinafter described in the claims, with reference being had to the accompanying drawings forming a part thereof, wherein like numerals refer to like elements throughout.

BRIEF DESCRIPTION OF THE DRAWINGS

FIG. 2 is a listing of C language source code for a random number generator and initialization routine.

FIG. 3 is a table showing grouping of voice messages stored for playback to a caller or system user.

FIGS. 4a–4d are flow processing diagrams for a voice response unit providing telephone directory and call completion services including variable user prompting.

DETAILED DESCRIPTION OF THE PREFERRED EMBODIMENT

Figure 1:
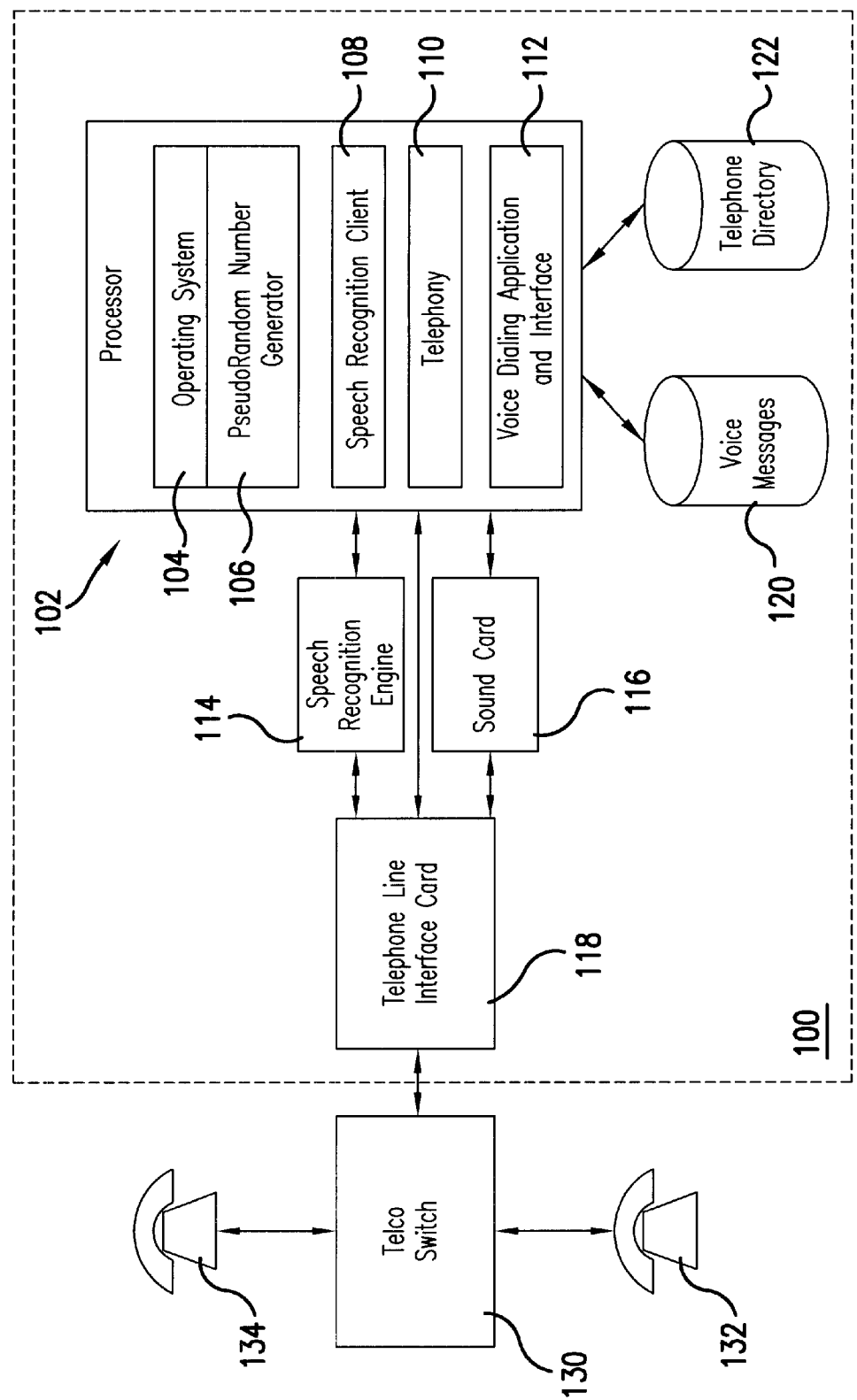
FIG. 1 is a block diagram of a voice response unit including variations in prompting messages.

FIG. 1 is a functional block diagram of a voice response unit 100 for providing telephone directory information to a caller and for providing related services including call completion to the named party. VRU 100 includes a processor 102 connected to, controlling, and receiving a recognized speech output from a speech recognition engine 114. Processor 102 is also connected to a sound card 116 for playing and/or synthesizing voice messages to a caller. Telephone line interface card 118, under control of processor 102, supplies an audio output from telephone equipment represented by telco switch 130 to speech recognition engine 114. Sound card 116, in turn, provides a speech audio output to telephone line interface card 118 for transmission to telco switch 130.

Processor 102 has further access to mass storage, conventionally in the form of a hard disk memory, including stored voice messages 120 and telephone directory 122. Processor 102 includes and runs several software systems including a supervisory operating system 104 (including PseudoRandom Number Generator 106), Speech Recognition Client 108, Telephony module 110, and Voice Dialing Application and Interface 112. Conventionally, pseudorandom number generator 106 may be implemented in software as an operating system supplied function, although specialized applications and even hardware implementations are also possible. Also depicted in FIG. 1, for purposes of illustration of the VRU, are calling party 122 connected to telco switch 120 and a called party 124, likewise connected to telco switch 120.

Processor 102 may be a dedicated, specialized central processing unit (CPU) board running specialized software, or may be a general purpose personal computer or workstation running an appropriate operating system such as Windows NT or UNIX. Other suitable platforms include the SUN Sparc20, Pentium 200, Periphonics VAS, IBM RS6000 with direct talk, or the Dialogic Antares card utilizing digital signal processing (DSP) technology.

Pseudorandom number generator 106 may be a standard operating system-supplied random number function such as supported by ANSI C. One possible implementation for such a system function is illustrated in the listing of FIG. 2. A call to this random number function would produce a value between zero and 32,767 which would be scaled to correspond with the number of voice message variations available for a particular prompt. One method of scaling is to divide the range into a series of subranges. For example, if the system is to randomly select amongst five content equivalent prompts, the value returned by the function listed in FIG. 3 could be used to produce a random integer J between 1 and 5 using the following code:

$$J=1+(INT)(5.0*RAND(\$)/32768));$$

Alternatively, other random number generators may be used, although quality of the randomness is not a major factor in the present embodiment.

In addition to the operating system and pseudorandom number generator, processor 102 runs software applications and modules written, for example, in "C" code for implementing a particular service, such as a voice dialing application. In this configuration, speech recognition client 108 receives a speech signal from telephone line interface card 118 and performs preprocessing of the speech signal including gross and-pointing and speech buffer management. The speech recognition client 108 further manages the results provided by speech recognition engine 114 to match the phonetic strings with the appropriate names and telephone numbers stored in telephone directory 122. Telephone directory 122 includes three flat database files associated with matching including a names-file, nicknames-files and a phone book.

Telephony application 110 performs call answering, caller ID capture, speech capture, billing information processing and call transfer. The latter function, call transfer, may be provided by using the three-way calling feature of telco switch 130. Using this feature, after an incoming call has been terminated at telephone line interface card 118 and the telephone number of a requested party has been identified, telephone line interface card 118 is instructed by telephony module 110 to perform a switchhook operation to obtain a second dial tone from telco switch 130. The telephone number of the identified called party 134 is then outdialed to initiate a call to that party. Upon ring detection, telephone line interface card 118 performs a second flashhook operation to signal telco switch 130 to bridge calling party 132 and, subsequently, telephone line interface card 118 goes back on hook to drop out of the bridge and wait for the next user to call.

Voice dialing application and interface 112 provides system prompts, call error handling, call handling features (i.e., "call completion," "listing," "sent to mailbox," etc.) and manages the speech client recognition results to determine the appropriate response or prompt group of messages.

Stored voice messages 120 are arranged in groups of content equivalent prompts or messages as depicted in FIG. 3. Illustrated are five groups of messages A–E, each group comprising five content equivalent prompts 1–5. All of the prompts within a group are interchangeable, conveying substantially the same substance but with variations in wording and/or phraseology and sentence structure to mimic normal variations in human speech. For example, group A may include five suitable system greetings that might be played to a user when a call is first answered. Prompt A1 may include "Bell Atlantic, who would you like to call?"; prompt A2 might be "This is Bell Atlantic, who would you like to call?"; prompt A3 "Corporate dialing, who would you like to call?"; prompt A4 "This is the corporate dialer, who would you like to call?"; and prompt A5 "Bell Atlantic here, who would you like to call?". Similarly, each of groups B–E would include appropriate messages or prompts to be used in a particular situation, each of the five prompts within a particular group being interchangeable with substantially the same content, i.e., content equivalent prompts.

Telephone directory 122 may be a flat file of names, organizations, functions, etc., with their respective telephone numbers or other handling or routing information as appropriate or as required by the particular application.

Speech recognition engine 114 is preferably speaker independent so that there is no requirement for users to train the system to respond to their voices. The basic speech recognition technology is commercially available through several sources including Nuance Communications, Inc. Although shown apart from processor 102, speech recognition engine 114 may be implemented as an application running on processor 102. Upon receipt of a speech signal from telephone line interface card 118, speech recognition client 108 performs preprocessing of the speech signal for speech recognition engine 112 including gross and-pointing and speech buffer management. The buffered speech is processed to extract the phonetic components, match them with the appropriate speech models and return the highest probability string. The matching string is derived from a grammar file. The matching string is then associated with name files forming part of the telephone directory by a speech recognition client 108.

Figure 4A:
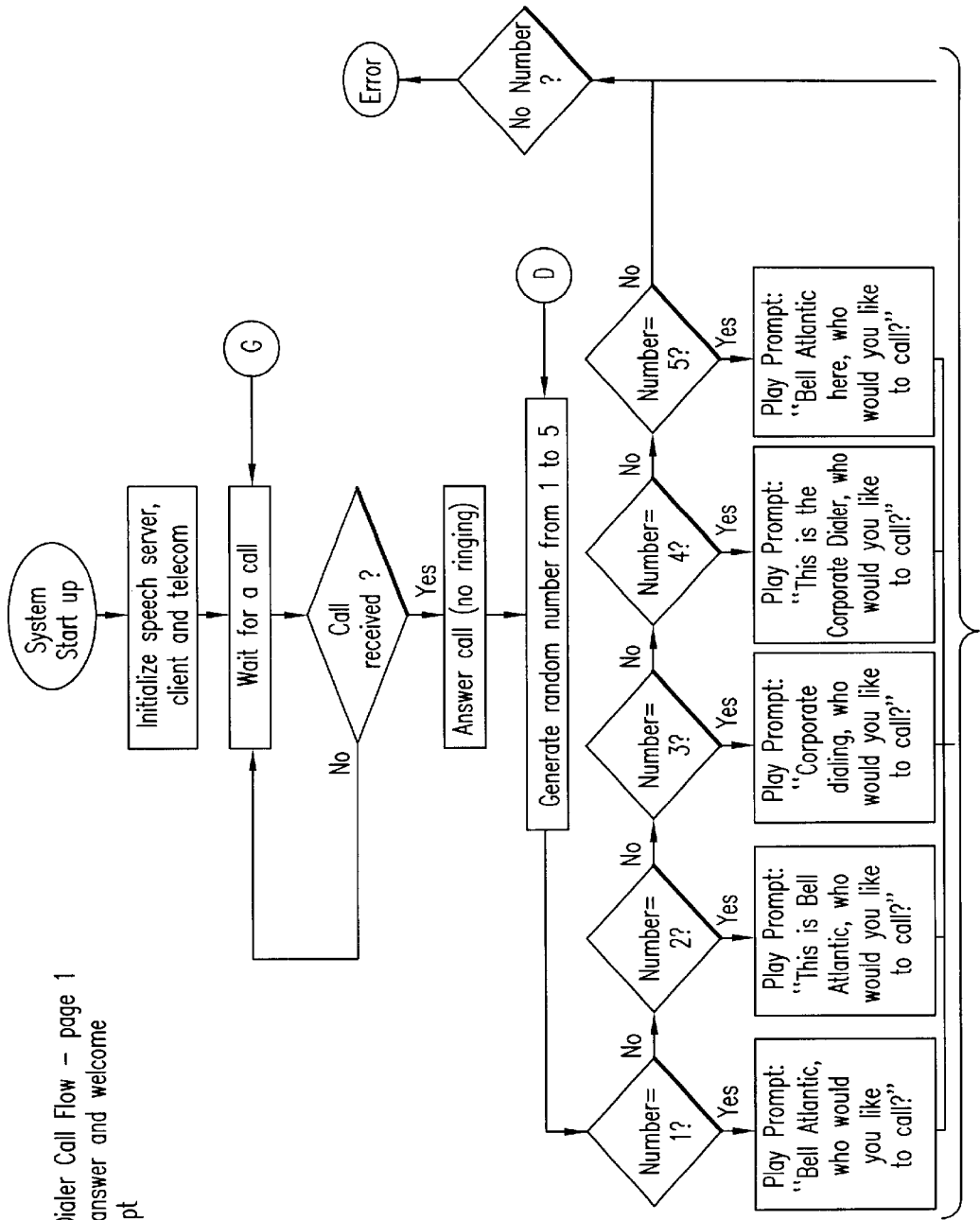
Figures 1, 4A:
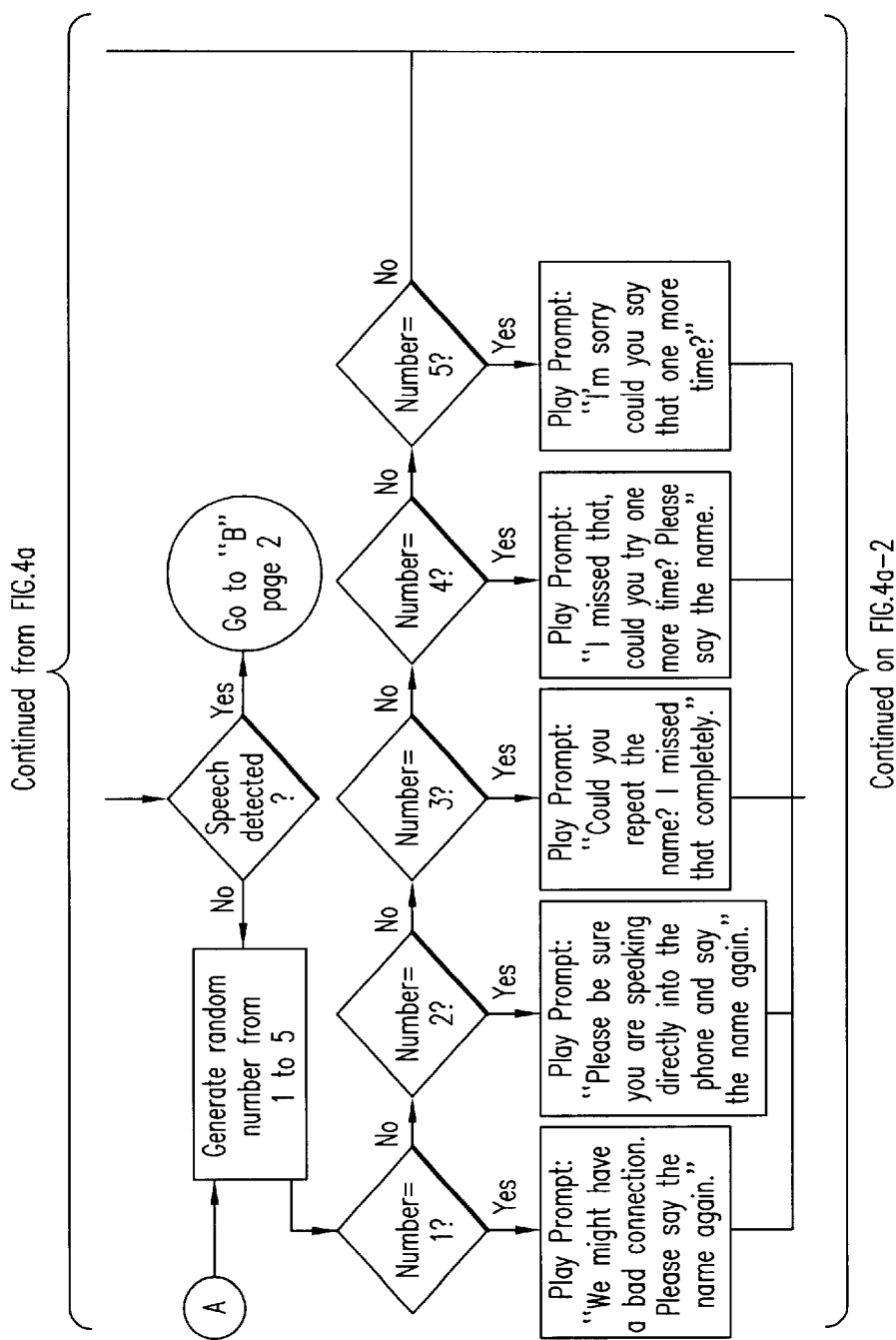
Figures 2, 4A:
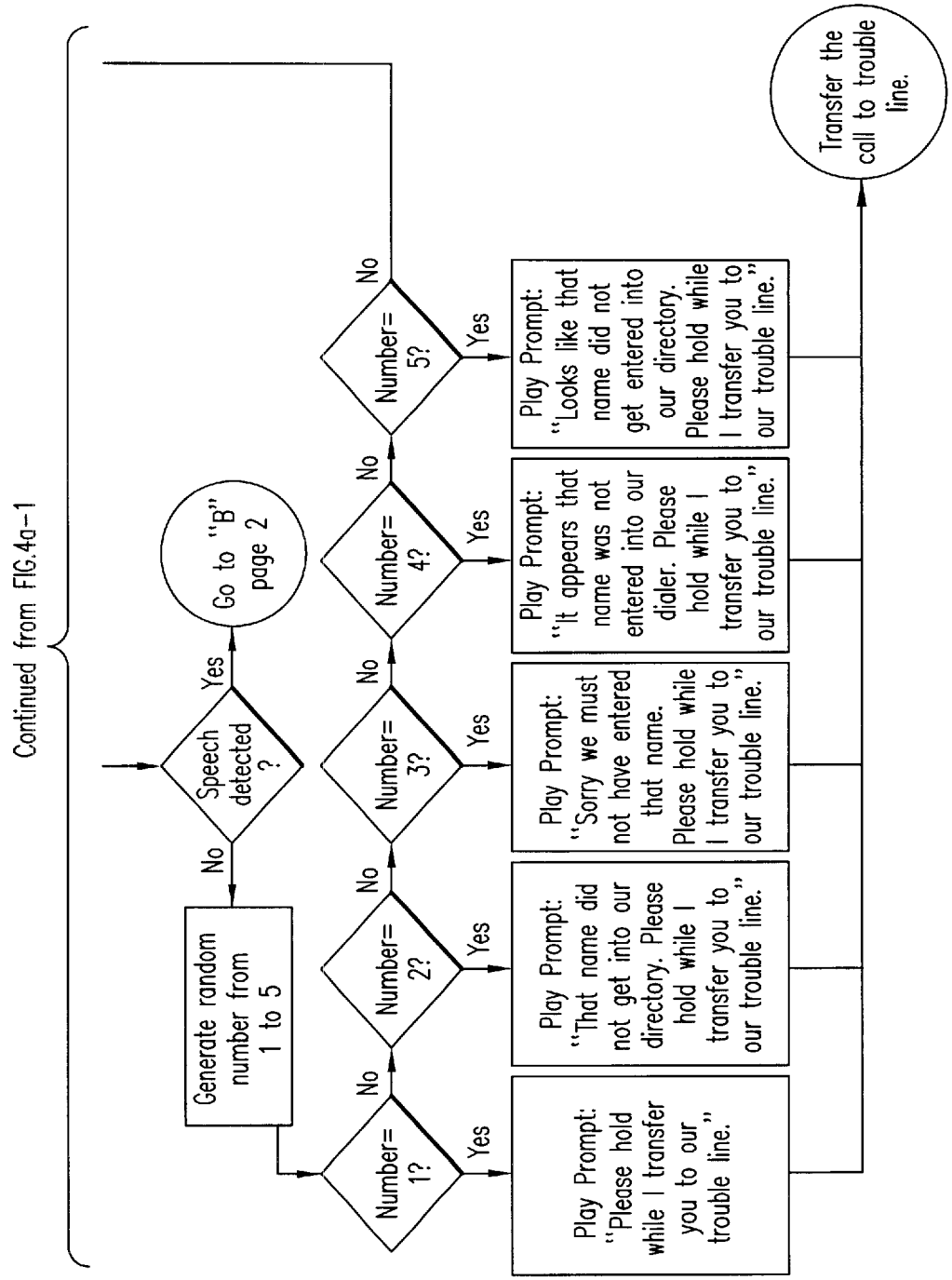
Figure 4B:
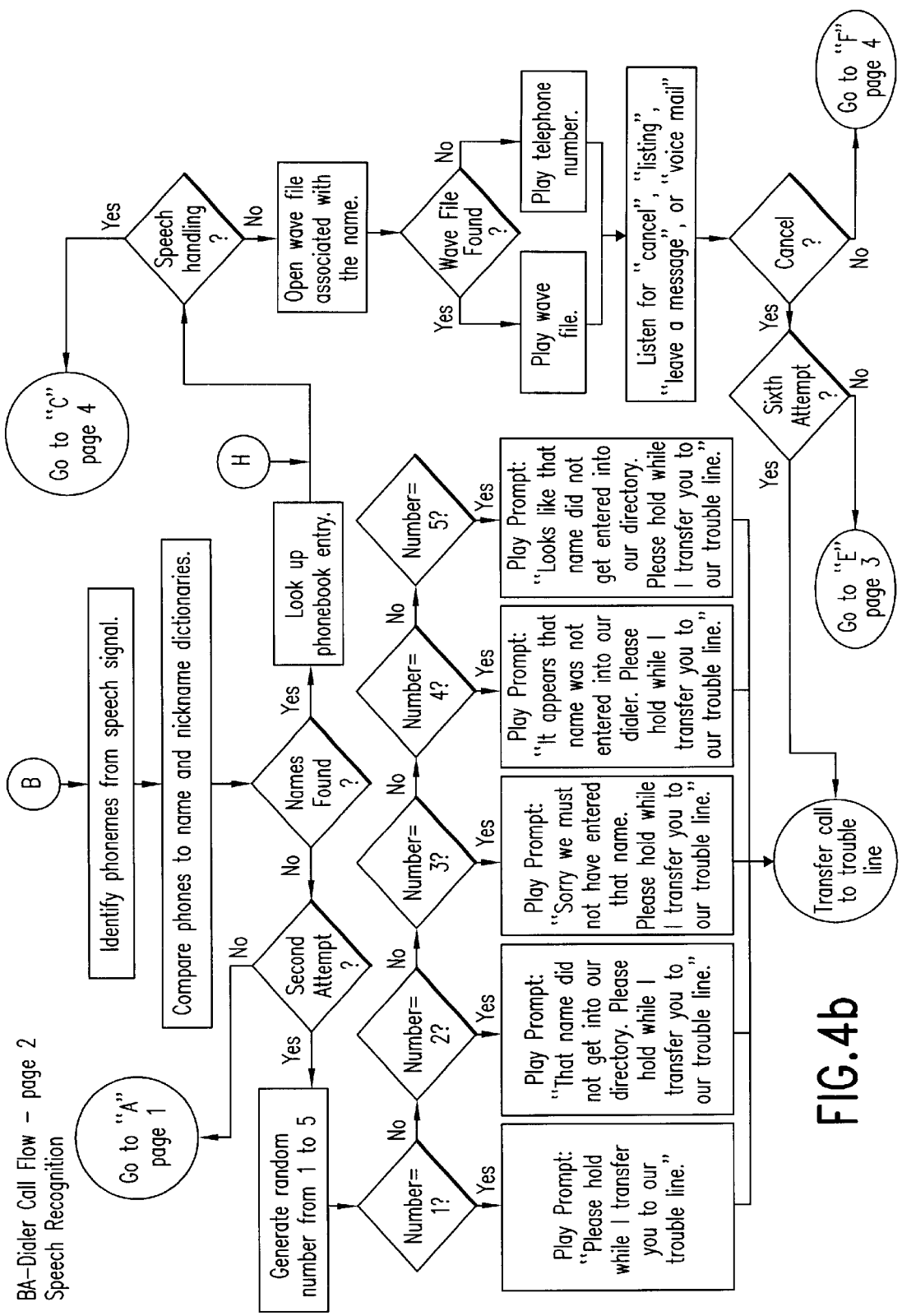
Figure 4D:
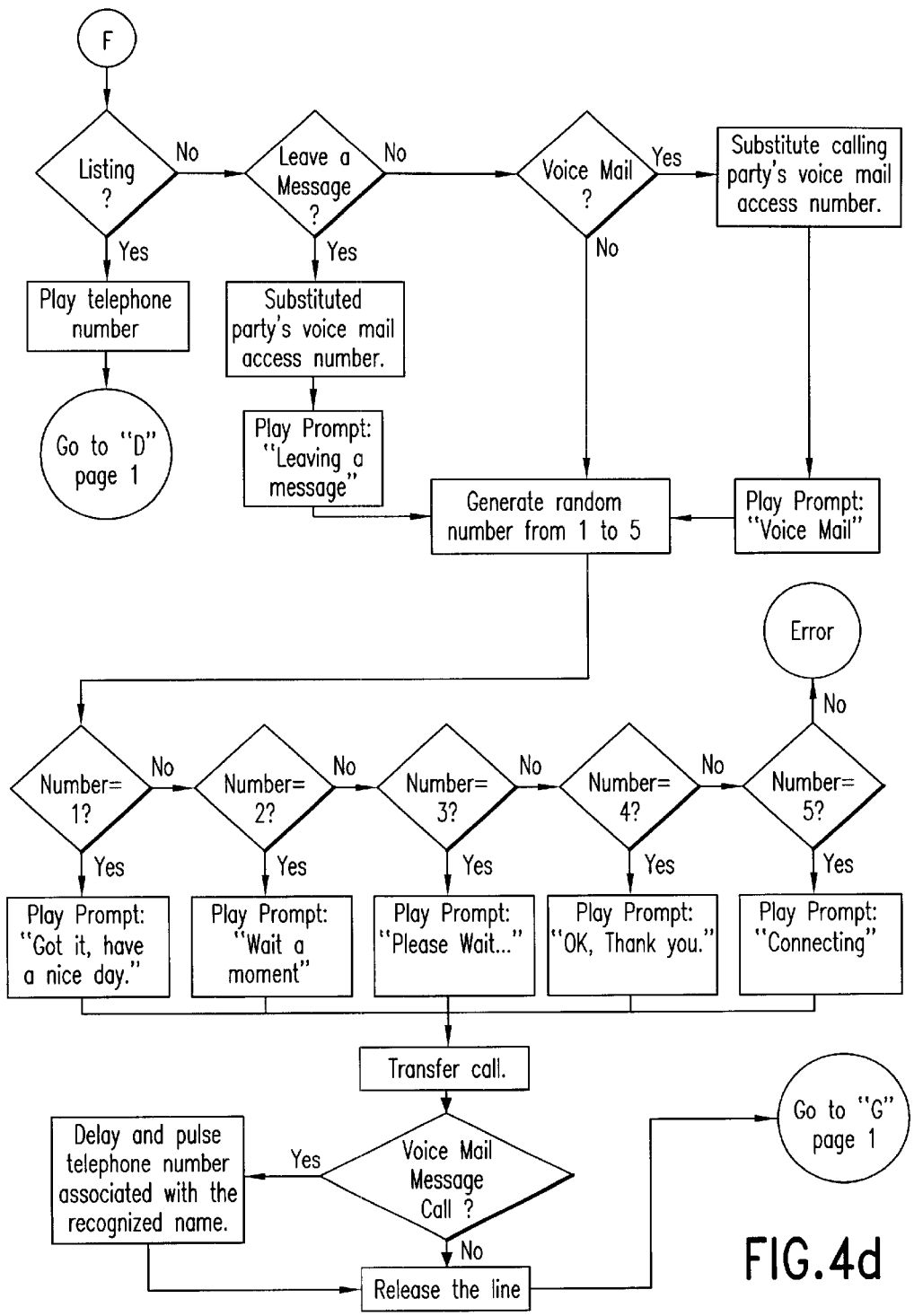
Figures 1, 4D:
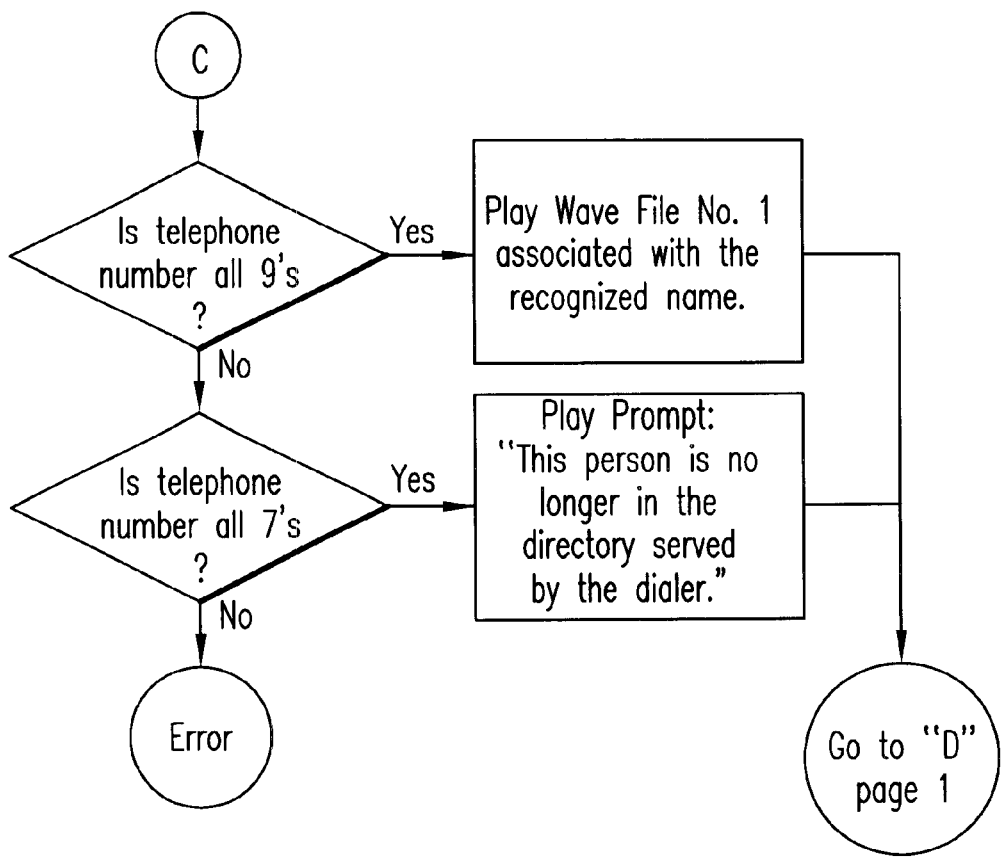

A flow diagram of an automated dialer according to the invention is shown in FIGS. 4a–4d. FIG. 4a shows call processing for call answer and provision of a welcome prompt. Speech recognition processing is further detailed in FIG. 4b. Processing for providing a second guess is shown in FIG. 4c. Finally, normal and special handling processing is shown in FIG. 4d.

Referring to FIG. 4a, at system start-up normal system configuration files are read and initialization of the speech server, client and telecom applications is performed. The program then enters a wait state until an incoming call is received. On detecting ringing, the call is answered by the telephone line interface card 116. A pseudorandom number between 1 and 5 inclusive is generated and used to randomly select one of five content equivalent greetings to be played to the caller. The content equivalent greetings are substantively the same, but vary slightly in wording and phraseology. If no speech is detected within a predetermined period after the greeting has completed, the system will prompt the caller to speak a name of the party to be called. Again, the prompt is selected from among five content equivalent messages in response to a newly generated random number. If, after a second period following this prompt no speech is detected from the calling party, one of five error messages is selected in response to another random number informing the caller that he or she is being transferred to a trouble line.

If speech is detected after the initial greeting or after the caller is prompted, processing continues as shown in the call flow of FIG. 4b. First, the system attempts to identify phonemes from the speech signal of the calling party. The phonemes are then compared to names and nicknames contained in the telephone directory and, if a name is found, the system proceeds to retrieve the associated telephone number. If the telephone number is invalid or is otherwise recognized to require special handling, processing continues as shown at connector C in the lower left of FIG. 4d. For example, if the associated telephone number is all 9's, the WAV file associated with the name is played, but no telephone number is dialed and processing loops back near the beginning of the call flow to play a new greeting and give the caller an opportunity to try another name. Alternatively, if the telephone number is all 7's, the caller is informed that the person named is no longer in the directory served by the system and, again, processing continues back to give the caller the opportunity to lookup another name.

Referring back to FIG. 4b, if the name is found and no special handling is indicated, the system will attempt to open a WAV format audio file associated with the name. If such a WAV file corresponding to the called party's name is found, then the name is played back to the caller to confirm that the correct directory listing has been identified by the system. Alternatively, if the system is unable to identify a WAV file associated with the found name, the corresponding telephone number is read back to the caller using a synthesized voice. In either case, the system waits for a predetermined time of between one and two and one-half seconds, and preferably within the range of 1.2 seconds to 2.3 seconds, an optimal time being 1.8 seconds, before proceeding to initiate dialing as shown at the top of FIG. 4d. If, however, the system recognizes the caller speak an exception processing command, such as "cancel," "listing," "leave a message," or "voice mail," a flag indicating the appropriate alternative processing is set. If the caller commands the system to cancel dialing by speaking the word "cancel" or any equivalent phrase (e.g., "stop," "no," "wait," "whoa,", etc.) and the system has made less than six attempts toward dialing a number, then processing continues at the top of FIG. 4c. There, if the system recognizer has a second guess (i.e., there as another close match), then a new pseudorandom number is obtained to select one of five error messages to be played to the caller indicating that the system has a second best guess that it will attempt to use. Processing then continues at the entry point shown by connector H in FIG. 4b to check for any special handling requirements as might be indicated by an invalid telephone number for the second guess. If no special handling is required, then the name of the second guess is played (or the corresponding telephone number is no WAV file is found). The system waits for 1.2 to 2.3 seconds for any alternative verbal instructions or processing interruption requests from the caller and, if none are received, dials the number.

If the calling party has indicated that the name or telephone number played is incorrect but the system does not have a second guess, then processing continues at entry point shown by connector A in FIG. 4a, affording the caller another chance to repeat the name or input another name.

If a name has been recognized and the caller has not indicated that the name or telephone number is incorrect, then processing continues at the top of FIG. 4d at connector F. If the caller has spoken the word "listing," or any equivalent recognized by the system (e.g., "number," etc.), then the telephone number corresponding to the found name is played and processing loops back to connector D in FIG. 4a. Special processing is also indicated by the caller speaking "leave a message" so that the voice mail telephone number of the called party is substituted for their direct dial number. The calling party is notified by the system they will be "leaving a message," one of five randomly selected closing messages is played, and the call is transferred to the called party's voice mail platform.

If the called party has spoken the phrase "voice mail," indicating that they would like to access their own voice mail, then the calling party's voice mail access number is substituted, the message "voice mail" is played and processing continues as before.

If a name and valid telephone number have been identified, and no special processing has been requested, call flow continues in the middle of FIG. 4d to generate a random number used to select one of five closing messages and the call is transferred to the telephone number identified. In the case of a caller having requested his or her own or the voice mail of the called party, the system delays release of the line until it can provide the voice mail platform with the appropriate voice mailbox identification using in-band DTMF signaling or equivalent as shown at the bottom of FIG. 4d.

Although the embodiment of the invention described herein includes five randomly selected, content equivalent phrases or prompts comprising each group of messages, smaller or larger numbers may be used. Further, it is not necessary that each group have the same number of content equivalent prompts. For example, a field can be included for each group indicating the number of messages or prompts contained within the group and this number would be used to generate an appropriate random number for selecting a member of the group. Further variation can be implemented by dividing each message into multiple portions, each portion having multiple alternative wordings, the message being formed by the concatenation of the randomly chosen segments. For example, an opening message might be composed of a segment identifying the platform concatenated with a greeting segment followed by an instruction segment. Each segment would be chosen at random. The first segment might be chosen from among the phrases "BA dialer," "corporate dialer," "Bell Atlantic dialer," etc. The second segment might include the phrases "standing by," "here," "at your service," etc. Finally, the instructions might include wordings such as "please speak a name," "who are you calling," "what listing," "name please," etc. By segmenting the message with each segment chosen at random, even further variation in the message wording may be obtained to further reduce the machine-like speech patterns characteristic of other VRUs.

Although several embodiments of the invention have been described in detail above, it should be clear that the present invention is capable of numerous modifications as would be apparent to one of ordinary skill in the art. Such modifications fall within the purview of the appended claims.

It will be readily seen by one of ordinary skill in the art that the present invention fulfills all of the objects set forth above. After reading the foregoing specification, one of ordinary skill will be able to effect various changes, substitutions of equivalents, and various other aspects of the invention as broadly disclosed herein. It is therefore intended that the protection granted herein be limited only by the definition contained in the appended claims and equivalents thereof.

What is claimed is:

1. A voice response unit for responding to spoken commands, comprising:

a memory storing a plurality of voice messages arranged in groups of content equivalent messages, each of the messages of a group having different a wording;

a speech recognition engine receiving a speech input signal and, in response, providing an output signal indicative of said speech input signal;

a processor responsive to (i) said output signal for selecting one of said groups of content equivalent messages and (ii) a pseudorandom number for selecting one of said voice messages within the selected group;

a speech output device providing an audio signal corresponding to the selected voice message stored in said memory.

2. The voice response unit according to claim 1 wherein said processor further includes a pseudorandom number generator supplying said pseudorandom number.

3. The voice response unit according to claim 1 wherein said processor further includes a pseudorandom number generator calculating numeric values falling within a predetermined range, said range divided into a plurality of subranges wherein, within each of said groups of voice messages, each voice message is associated with a different one of said subranges.

4. The voice response unit according to claim 3 wherein said subranges are substantially coextensive and equal in number to a number of voice messages within each of said groups of content equivalent messages.

5. The voice response unit according to claim 3 wherein said numeric values comprise uniform deviates within the predetermined range.

6. The voice response unit according to claim 1 wherein said processor further includes a pseudorandom number generator calculating numeric values falling within a predetermined range wherein, within each of said groups of voice messages, each voice message is associated with a different one of said numeric values.

7. The voice response unit according to claim 1 wherein each of said voice message are stored in said memory in a WAV format.

8. The voice response unit according to claim 1 wherein each of said voice message are stored in said memory in a compressed audio for mat.

9. The voice response unit according to claim 8 wherein said compressed audio format is MPEG Layer 3 (MP3).

10. The voice response unit according to claim 1 further including:

an interface connected to a telephone switch and receiving said speech input signal;

a telephone directory listing subscribers and respective telephone numbers of said subscribers; and dialing means responsive to a selected one of said telephone numbers for completing a telephone call to a corresponding one of said subscribers, wherein said processor is responsive to said output signal from said speech recognition engine for selecting one of said subscribers and an associated one of said telephone numbers from said telephone directory.

11. A method of responding to spoken commands, comprising the steps of:

storing a plurality of voice messages arranged in groups of content equivalent messages, each of the messages of a group having different a wording;

receiving a speech input signal;

processing said speech signal to recognize a content thereof;

selecting, in response to said content, one of said groups of content equivalent messages;

generating a pseudorandom number;

selecting one of said voice messages within the selected group in response to said pseudorandom number; and providing an audio signal corresponding to the selected voice message stored in said memory.

12. The method according to claim 11 wherein said storing step includes converting a speech signal into a WAV file.

13. The method according to claim 11 wherein said storing step includes compressing a speech signal to form a compressed speech signal and encoding the compressed speech signal.

14. The method according to claim 13 wherein said encoding step is performed using an MP3 compliant encoding scheme.

15. A computer readable medium containing program instructions stored therein that implement a method of responding to spoken commands, said method comprising the steps of:

storing a plurality of voice messages arranged in groups of content equivalent messages, each of the messages of a group having different a wording;

receiving a speech input signal;

processing said speech signal to recognize a content thereof;

selecting, in response to said content, one of said groups of content equivalent messages;

generating a pseudorandom number;

selecting one of said voice messages within the selected group in response to said pseudorandom number; and providing an audio signal corresponding to the selected voice message stored in said memory.

16. The computer readable medium according to claim 15 wherein said storing step according to said method includes converting a speech signal into a WAV file.

17. The computer readable medium according to claim 15 wherein said storing step according to said method includes compressing a speech signal to form a compressed speech signal and encoding the compressed speech signal.

18. The computer readable medium according to claim 17 wherein said encoding step according to said method is performed using an MP3 compliant encoding scheme.

* * * * *